(12) United States Patent
Gao et al.

(10) Patent No.: US 10,508,641 B2
(45) Date of Patent: Dec. 17, 2019

(54) WAVE ENERGY GENERATION APPARATUS

(71) Applicant: Xianle Gao, Beijing (CN)

(72) Inventors: Xianle Gao, Beijing (CN); Shujing Bian, Beijing (CN); Jinyan Gao, Beijing (CN)

(73) Assignee: Xianle Gao, Beijing (CN)

( * ) Notice: Subject to any disclaimer, the term of this patent is extended or adjusted under 35 U.S.C. 154(b) by 0 days.

(21) Appl. No.: 15/765,850

(22) PCT Filed: Dec. 20, 2016

(86) PCT No.: PCT/CN2016/111033
§ 371 (c)(1),
(2) Date: Apr. 4, 2018

(87) PCT Pub. No.: WO2018/014499
PCT Pub. Date: Jan. 25, 2018

(65) Prior Publication Data
US 2018/0291865 A1 Oct. 11, 2018

(30) Foreign Application Priority Data

Jul. 22, 2016 (CN) .......................... 2016 1 0589397
Jul. 22, 2016 (CN) .......................... 2016 1 0589399

(51) Int. Cl.
F03B 13/00 (2006.01)
F03B 13/18 (2006.01)
F03B 13/22 (2006.01)

(52) U.S. Cl.
CPC .......... F03B 13/1815 (2013.01); F03B 13/22 (2013.01); F05B 2240/244 (2013.01); F05B 2240/95 (2013.01); F05B 2250/14 (2013.01)

(58) Field of Classification Search
CPC ...... F03B 11/02; F03B 13/18; F03B 13/1815; F03B 13/22; F05B 2240/244; F05B 2240/95; F05B 2250/14
(Continued)

(56) References Cited

U.S. PATENT DOCUMENTS 4,077,213 A * 3/1978 Hagen ................. F03B 13/20
417/331
4,179,886 A 12/1979 Tsubota
(Continued)

FOREIGN PATENT DOCUMENTS

CN 1945011 A 4/2007
CN 101624960 A 1/2010
(Continued)

OTHER PUBLICATIONS

PCT/CN2016/111033 International Search Report dated May 3, 2017, 8 pages.
(Continued)

Primary Examiner — Julio C. Gonzalez
(74) Attorney, Agent, or Firm — RatnerPrestia

(57) ABSTRACT

Disclosed is a wave energy power generation apparatus, comprising a plurality of wave energy collecting units. Each of the wave collecting units comprises: a potential energy collecting assembly used for collecting wave potential energy, a kinetic energy collecting assembly used for collecting wave kinetic energy and a positioning assembly used for vertically limiting and horizontally positioning buoyancy compartments. The apparatus is beneficial for improving the collection efficiency of wave energy, and simultaneously can satisfy the purposes of long-term safe and stable operation, of being adapted for scaled construction.

18 Claims, 5 Drawing Sheets

(58) Field of Classification Search
USPC ....... 290/42, 53; 60/501, 496, 495, 498, 502
See application file for complete search history.

(56) References Cited

U.S. PATENT DOCUMENTS

| | | | | |
|---|---|---|---|---|
| 4,208,875 | A * | 6/1980 | Tsubota | F03B 13/184 417/331 |
| 4,210,821 | A * | 7/1980 | Cockerell | F03B 13/20 290/53 |
| 4,291,234 | A * | 9/1981 | Clark | F03B 13/1815 290/42 |
| 4,389,843 | A * | 6/1983 | Lamberti | F03B 13/1815 290/42 |
| 5,244,359 | A * | 9/1993 | Slonim | F03B 13/1875 417/332 |
| 5,405,250 | A * | 4/1995 | Vowles | F03B 13/1815 417/331 |
| 5,854,516 | A * | 12/1998 | Shim | F03B 13/1815 290/53 |
| 6,849,963 | B2 * | 2/2005 | Grinsted | F03B 17/06 290/42 |
| 8,093,735 | B1 * | 1/2012 | Rosiglioni | F03B 13/189 290/42 |
| 2007/0048086 | A1 | 3/2007 | Thorsbakken | |
| 2008/0018114 | A1 * | 1/2008 | Weldon | F03B 13/181 290/53 |
| 2009/0158729 | A1 * | 6/2009 | Hatzilakos | F03B 13/1815 60/497 |
| 2011/0042954 | A1 * | 2/2011 | Werjefelt | F03B 13/20 290/53 |
| 2011/0304144 | A1 * | 12/2011 | Dehlsen | E02B 9/08 290/53 |
| 2012/0104761 | A1 * | 5/2012 | Vamvas | F03B 13/16 290/53 |

FOREIGN PATENT DOCUMENTS

| | | |
|---|---|---|
| CN | 102644537 A | 8/2012 |
| CN | 202500709 U | 10/2012 |
| CN | 103758687 A | 4/2014 |
| CN | 204691996 U | 10/2015 |
| CN | 106014843 A | 10/2016 |
| CN | 106014844 A | 10/2016 |
| CN | 205841084 A | 12/2016 |
| CN | 205841085 A | 12/2016 |
| SG | 193480 A1 | 10/2013 |
| WO | 2005026535 A2 | 3/2005 |
| WO | 2008122867 A2 | 10/2008 |
| WO | 2012126009 A2 | 9/2012 |
| WO | 2014170557 A1 | 10/2014 |

OTHER PUBLICATIONS

EP Search Report, Application No. 16 909 426.5, dated Feb. 15, 2019, 4 pages.

* cited by examiner

WAVE ENERGY GENERATION APPARATUS

FIELD OF THE INVENTION

The present invention involves a wave energy generation apparatus.

BACKGROUND OF THE INVENTION

Wave energy generation began in the 1970s, in the prior art, there are various types of wave energy generation apparatus with different scales developed by, for example, Japan, the United States, Britain, Norway and other countries, wherein nodding duck-type, oscillating floats-type, oscillating water column-type, sea snake-type, sea clam-type, soft bag-type and other types of wave energy generation apparatus are the most representative types, wherein:

1) Nodding duck-type wave energy generation apparatus mainly takes advantage of wave level difference and collects potential energy of wave level difference, of which up and down nodding motion of a bulge portion of a duck head takes place along with wave;

2) Oscillating floats-type wave energy generation apparatus collects potential energy of wave level difference by means of up and down motion of floats accompanying with wave level;

3) Oscillating water column-type wave energy generation apparatus achieves collection of wave potential energy by compressing air using wave level difference;

4) Sea snake-type wave energy generation apparatus takes advantage of wave level difference of crests and troughs in the front and rear waves to generate power and collects potential energy of wave level difference, wherein hydraulic energy is produced by reciprocating motion of a hydraulic cylinder of a hinged connection point driven by up and down motion of the front and rear floats accompanying with wave;

5) Sea clam-type wave energy generation apparatus collects kinetic energy of wave by generating energy via using a hydraulic cylinder at the bottom of a clam housing which is driven by reciprocating swinging of the clam body accompanying with surging of wave;

6) Soft bag-type wave energy generation apparatus collects kinetic energy of forward surging wave by generating kinetic energy by using an impeller at the rear of a soft bag which is driven by air flow within the soft bag driven with surging of wave kinetic energy.

Among the above mentioned technologies, the nodding duck-type, oscillating floats-type and oscillating water column-type mainly collect or convert potential energy of wave level difference, while the sea clam-type and soft bag-type mainly collect kinetic energy of surging wave. However, these wave energy generation apparatus have a relative low collection efficiency of wave energy and thus are disadvantageous for intensively constructing a sea wave energy station in large scale.

SUMMARY OF THE INVENTION

In this connection, the primary object of the present invention is to provide a wave energy generation apparatus which is advantageous for improving collection efficiency of wave energy.

The present invention provides a wave energy generation apparatus comprising multiple sets of wave energy collecting units, wherein a single set of wave energy collecting unit comprises a energy collecting assembly for collecting wave energy, the energy collecting assembly comprising a potential energy collecting assembly for collecting potential energy of wave and a kinetic energy collecting assembly for collecting kinetic energy of wave, wherein, the potential energy collecting assembly comprises a buoyancy compartment; a positioning assembly for positioning the buoyancy compartment, the positioning assembly comprising a perpendicular position-restricting assembly for restricting a position of the buoyancy compartment.

With this technical solution, the wave energy generation apparatus is provided with both the potential energy collecting assembly and the kinetic energy collecting assembly, so that collection of wave potential energy and collection of wave kinetic energy can be performed at the same time, compared to separate collection of potential energy or kinetic energy in the prior art, it is conducive to improve the collection efficiency of wave energy.

Preferably, the buoyancy compartment is a housing having a longitudinal cross-section in a form of transversely set elongated ellipse or spindle.

With this technical solution, since the longitudinal cross-section of the buoyancy compartment is in a form of the transversely set elongated ellipse or spindle, it can reduce resistance imposed by seawater flowing across surface of the buoyancy compartment, and thus increase the passing speed of wave and is conducive to improve the collection effect of potential energy.

Preferably, a guide rudder is hinged or rotatively connected to the front end of the buoyancy compartment; inside of the buoyancy compartment, a guide rudder drive unit is provided for driving the guide rudder to deflect with respect to a main body of the buoyancy compartment on basis of received control commands.

With this technical solution, the guide rudder can, on one hand, increase an ascent rate of the buoyancy compartment and thus improve the collection efficiency of potential energy of wave; on the other hand, it can guide and force wave to flow along the lower surface of the buoyancy compartment, and thus is advantageous for pushing an impeller of the kinetic energy collecting assembly to rotate, thereby to improve collection efficiency and effect of wave energy. Furthermore, based on the received control commands, the guide rudder drive unit drives the guide rudder to deflect with respect to the main body of the buoyancy compartment and controls deflecting angle of the buoyancy compartment so that the ascent and sinking rate of the buoyancy compartment with respect to the sea level can be adjusted and thereby the buoyancy compartment can be protected effectively.

Preferably, a wave gauge is further included, the guide rudder drive unit is communicatively connected to the wave gauge, the deflecting angle of the guide rudder with respect to the buoyancy compartment is controlled by the guide rudder drive unit on the basis of the control commands sent from the wave gauge.

With this technical solution, the deflecting angle of the guide rudder with respect to the buoyancy compartment can be changed in time by the control commands sent from the wave gauge, so that control precision of deflecting angle of the guide rudder can be improved.

Preferably, an end of the guide rudder away from the buoyancy compartment is formed with a tip portion or a wedge-shaped portion.

With this technical solution, it is conducive to ensure and improve guiding effect of the guide rudder to wave.

Preferably, a ballast water tank for adjusting the up and down floating degree of the buoyancy compartment with respect to the sea level by changing water filling amount is further included, which is connected to the buoyancy compartment.

With this technical solution, since the ballast water tank is provided, weight of the buoyancy compartment can be adjusted by adjusting the water filling amount inside of the ballast water tank on the basis of the real-time sea condition, and floating extent of buoyancy compartment with respect to the sea level thus can be adjusted to allow power-limiting operation of the wave energy generation apparatus in the case of overload due to large wave, to allow it to sink under the sea level and to be shut down in order to achieve protection function in the case of extreme sea condition, and to allow the ballast water tank to drain out of water to make the buoyancy compartment rise up to the sea surface automatically and back to its normal operation in the case where the sea condition is back to normal, it is conducive to improve stability and thus viability of the wave energy generation apparatus in various working condition.

Preferably, the ballast water tank is provided inside of the buoyancy compartment.

Preferably, volume of the ballast water tank and volume of the buoyancy compartment are set into a specific ratio, which satisfies that, after the ballast water tank is filled with water, the total weight of the buoyancy compartment is greater than or equal to the buoyancy of the whole buoyancy compartment, and after the ballast water tank is drained out of water, the total weight of the buoyancy compartment is less than the buoyancy of the whole buoyancy compartment.

Preferably, the ballast water tank is provided at a position near the center of gravity or middle rear portion of the buoyancy compartment.

Preferably, the kinetic energy collecting assembly comprises a perpendicular shaft impeller, which is mounted at the rear end of the buoyancy compartment in such a manner that its rotation shaft is perpendicular to the surging direction of wave.

With this technical solution, kinetic energy of wave can be collected more efficiently and it is advantageous for improving efficiency and effect of kinetic energy of wave.

Preferably, a recess portion recessing upward is provided on the lower surface of the buoyancy compartment, and the perpendicular shaft impeller is mounted at the recess portion.

With this technical solution, the recess portion can change a flow path of wave flowing across the lower surface of the buoyancy compartment and increase flow speed of wave to a certain extent at the same time, it is conducive to further increase force which wave exerts on the perpendicular shaft impeller, thereby to better push rotation of the perpendicular shaft impeller, and thus is advantageous for improving efficiency and effect of kinetic energy of wave.

Preferably, a kinetic energy conversion assembly transmission-connected to the perpendicular shaft impeller for converting kinetic energy of wave into hydraulic energy is equipped inside of the buoyancy compartment.

Preferably, the potential energy collecting assembly further comprises at least one vertically provided hydraulic cylinder, two ends of this hydraulic cylinder are hinged to the sea floor and the buoyancy compartment respectively, the hydraulic cylinder further plays a role of vertically restricting a position of the buoyancy compartment and constitutes the vertical position-restricting assembly.

Preferably, a hydraulic system cooperated with the hydraulic cylinder(s) for controlling elongation of the hydraulic cylinder(s) to raise the buoyancy compartment away from the water surface is provided inside of the buoyancy compartment.

With this technical solution, during power generation, the up and down motion of the buoyancy compartment accompanying with wave drives a telescopic movement of the hydraulic cylinder, which generates hydraulic energy. During inspection, the elongation of the hydraulic cylinder is controlled by the hydraulic system to raise the buoyancy compartment away from water surface and thereby to facilitate the inspection of the buoyancy compartment.

Preferably, the positioning assembly further comprises a horizontal positioning assembly which horizontally positions the buoyancy compartment.

With this technical solution, position in the horizontal direction is mainly achieved by using the horizontal positioning assembly and position restricting in vertical direction is achieved by using the vertical position-restricting assembly, so that the buoyancy compartment can only fluctuate up and down in the positioned point but not drift forward nor backward, neither leftward nor rightward, in a large range; in this way, multiple sets of wave energy collecting units of the wave energy generation apparatus can be set individually on the sea floor and fixed on fixed points, and drift and collision of wave energy generating units along with wave can be avoided, sets of wave energy collecting units work independently without interference to each other, the collected energy is gathered to a power generation platform, which is advantageous for dense construction of the wave energy collecting units in a limited sea area and thereby intensive construction large wave energy stations in large scale. Meanwhile, due to the above mentioned structure, the wave energy collecting unit can also maintain structural stability under extreme sea conditions, and thus achieves the purpose of shutdown protection.

Preferably, the horizontal positioning assembly comprises at least one pole fixed vertically on the sea floor, the buoyancy compartment is connected to the at least one pole by a connecting element.

With this technical solution, the buoyancy compartment is connected to at least one pole fixed vertically on the sea floor by the connecting element, in this way, multiple sets of wave energy collecting units can be set individually on the sea floor and fixed on fixed point, and drift and collision of wave energy collecting units along with wave can be avoided, sets of wave energy collecting units work independently without interference to each other, which is advantageous for intensively constructing large wave energy stations in large scale.

Preferably, at least one linkage is provided between the single pole and the buoyancy compartment, and two ends of the linkage are rotatively connected or hinged to the pole and the buoyancy compartment respectively, the connecting element is constituted by the at least one linkage.

With this technical solution, position of the buoyancy compartment in the horizontal direction can be achieved.

Preferably, two said linkages are provided, the front ends of these two linkages are provided and spaced apart on the buoyancy compartment and their rear ends are gathered together on the pole.

With this technical solution, a connection structure with a triangular arrangement is formed between the buoyancy compartment and a single pole, it have great stability and are advantageous for improving the stability of positioning performed by the horizontal positioning assembly to the buoyancy compartment.

Preferably, a balancing linkage for connecting two adjacent poles is provided therebetween.

With this technical solution, another connection structure with a triangular arrangement is formed among the two adjacent poles, the balancing linkage and the connecting element, it have great stability and are advantageous for improving the stability of horizontal position performed by the horizontal positioning assembly to the buoyancy compartment.

Preferably, the connecting element and/or the balancing linkage are constituted by elastic linkages.

With this technical solution, the elastic linkage is capable of changing the length in a certain range when subjected to a large external force. When the wave energy generation apparatus is subjected to an instant impact, peak torque exerted to the elastic linkage can be unloaded by the elastic linkage to avoid breakage of the linkage.

Preferably, a first auxiliary fixing rod for connecting the vertical position-restricting assembly and said at least one pole in the same set of the wave energy collecting unit is provided therebetween.

With this technical solution, it can reinforce position of poles, which is advantageous for improving the stability of poles.

Preferably, a second auxiliary fixing rod for connecting the vertical position-restricting assembly of one set of wave energy collecting unit and said at least one pole of the adjacent set of the wave energy collecting unit is provided therebetween.

With this technical solution, the second auxiliary fixing rod can be used for reinforcing position of poles, which is advantageous for improving the stability of poles.

Preferably, an ocean current collecting unit is mounted on the portion(s) of the at least one pole under the sea level, at least one of a wind energy collecting unit and a solar energy collecting unit is mounted on the portion(s) of the at least one pole above the sea level.

With this technical solution, a multi-purposes pole can be achieved, which is suitable for constructing integrated sea power station in large scale.

Preferably, at least one of an energy accumulator, a heat sink and a high pressure gas tank is provided inside of the buoyancy compartment.

DESCRIPTION OF EMBODIMENTS

Hereafter, embodiments of the present invention will be described in details with reference made to FIGS. 1 to 8. In the following description, a surging direction of wave is from left to right in FIGS. 1 to 8, a front end is referred to the left side in FIGS. 1-8, and a rear end is referred to the right side in FIGS. 1 to 8. A longitudinal direction refers to a direction that is perpendicular or approximately perpendicular to the sea level, a transversal direction refers to a direction that is parallel or approximately parallel to the sea level.

The wave energy generation apparatus according to the present invention which is a large wave energy generating array fixed on the sea floor, comprises multiple sets of wave energy collecting units 1 arranged in the form of matrix, and a power generation platform 2 provided between the multiple sets of wave energy collecting units 1, which platform integrates a power station, a step-up station and a centralized control platform into a whole. Wave energy is converted into hydraulic energy by means of the multiple sets of wave energy collecting units, this hydraulic energy is then gathered to the power generation platform 2 by which the hydraulic energy is converted into electric energy.

Figure 1:
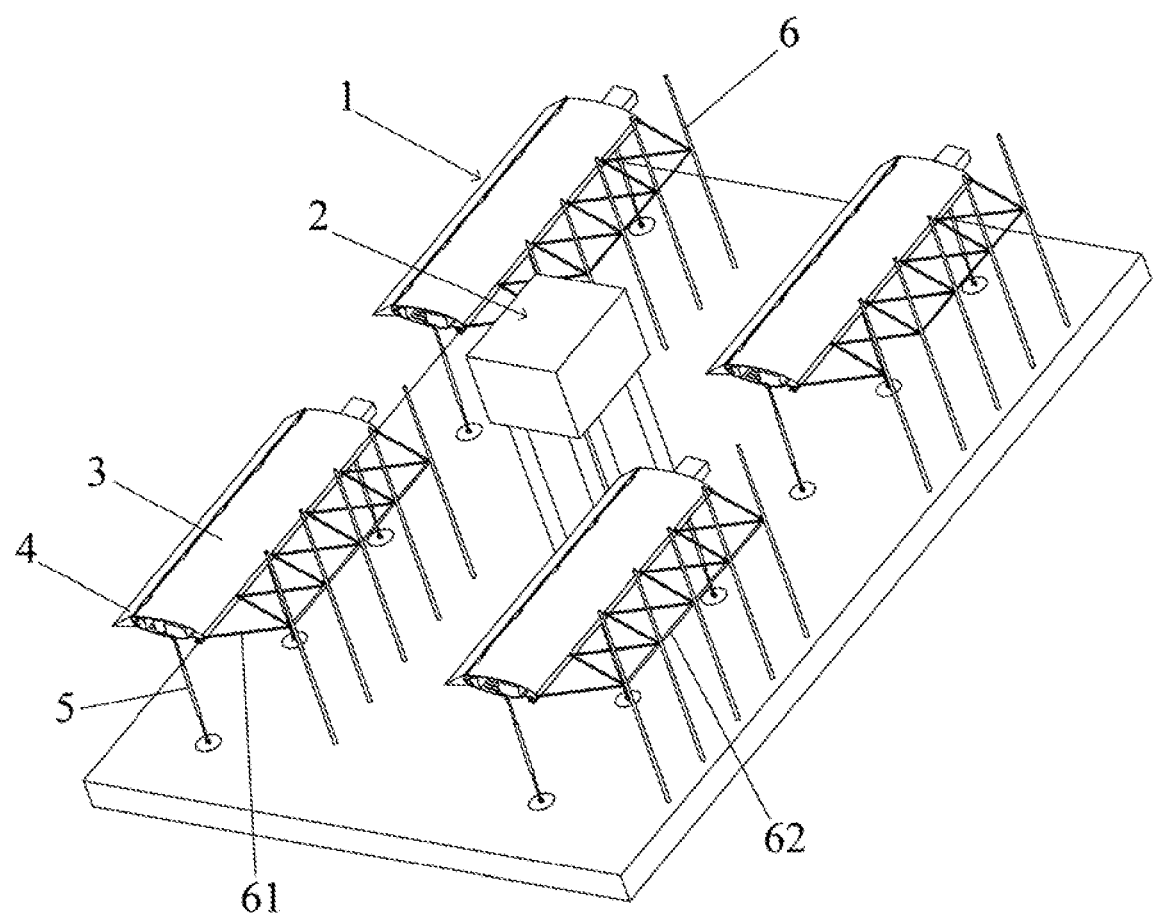
FIG. 1 is an oblique top view of a wave energy generation apparatus, which is the first embodiment.
Figure 2:
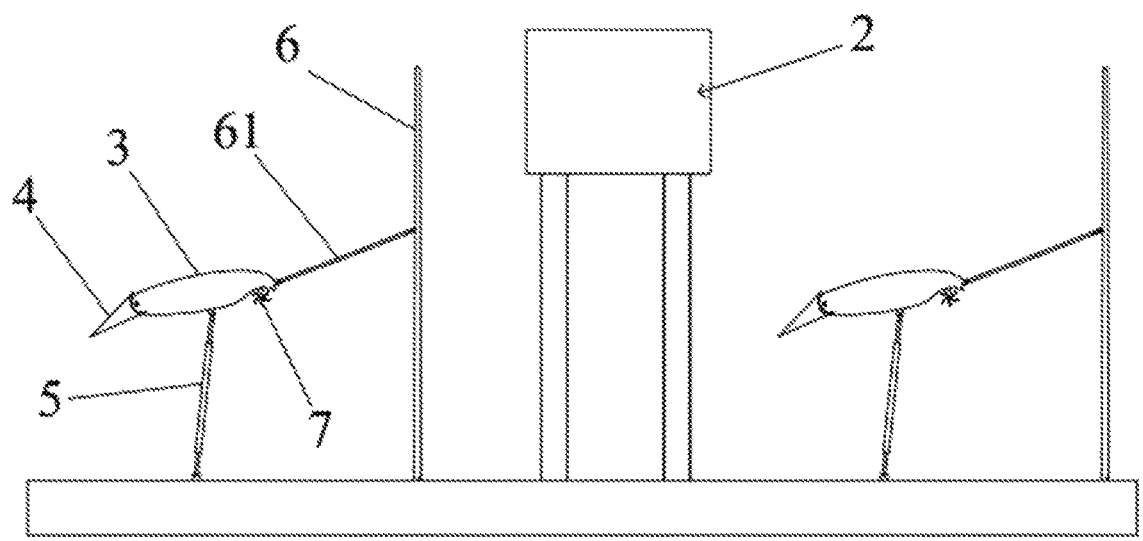
FIG. 2 is a front view of the wave energy generation apparatus shown in FIG. 1.
Figure 3:
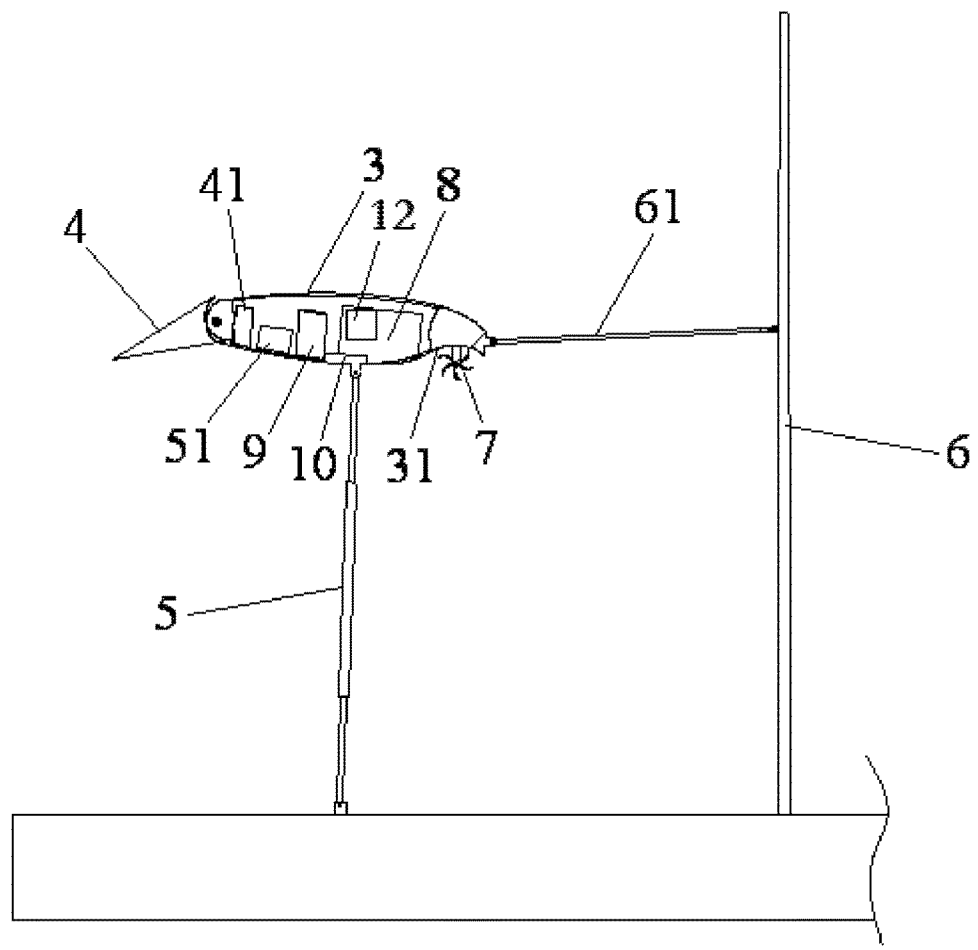
FIG. 3 is a partial sectional view of a single set of wave energy collecting unit in FIG. 1.

As shown in FIGS. 1-3, a single set of wave energy collecting unit 1 comprises a buoyancy compartment 3 arranged transversely. In the present embodiment, the buoyancy compartment 3 is a cylindrical housing having a longitudinal cross-section in a form of transversely set elongated ellipse or spindle, the kinetic energy collecting assembly and/or potential energy collection assembly are typically provided on the buoyancy compartment 3. At least one hydraulic cylinder 5 is provided near the center of gravity or along the horizontal centroid axis on the lower surface in the bottom of the buoyancy compartment 3. The hydraulic cylinder 5 is a telescopic hydraulic cylinder, the top end of the hydraulic cylinder 5 is hinged to the buoyancy compartment 3, and the bottom end of the hydraulic cylinder 5 is hinged to the sea floor directly or indirectly through a linkage. A vertical position-restricting assembly for collecting potential energy of wave and vertically restricting the position of the buoyancy compartment 3 is constituted by the aforementioned hydraulic cylinder 5. A hydraulic system 51 cooperated with the hydraulic cylinder 5 is further provided inside of the buoyancy compartment 3. The hydraulic system 51 increases a force which hydraulic cylinder 5 exerts to the float cabin 3 mainly by means of changing pressure, such that the elongation of the hydraulic cylinder 5 is controlled to raise the buoyancy compartment 3 away from water surface and thereby to facilitate the inspection of the buoyancy compartment 3. The structure of hydraulic system 51 can be achieved based on the prior art, and thus a detailed description is omitted.

The wave energy generation apparatus further comprises a plurality of poles 6 which are provided side by side at the rear of the buoyancy compartment 3 in the length direction of buoyancy compartment 3. These poles 6 are provided in the vertical direction, whose bottom ends are fixed on the sea floor by connecting elements. A balancing linkage 62 is provided between two adjacent poles 6, both ends of the balancing linkage 62 is fixedly connected or hinged to the adjacent poles 6. Two linkages 61 are provided between a single pole 6 and the buoyancy compartment 3, the front ends of these two linkages 61 are rotatively connected or hinged to the rear end of the buoyancy compartment 3 respectively and are provided and spaced apart on the buoyancy compartment 3, the rear ends of the above mentioned two linkages 61 are gathered together on the corresponding pole 6, and the above mentioned two linkages are rotatively connected or hinged to the corresponding respectively. The above-mentioned plurality of poles 6, the plurality of linkages 61 and the balancing linkage 62 together constitute a horizontal positioning assembly for horizontally position of buoyancy compartment 3. The above-mentioned linkages 61 and the balancing linkage 62 can be constituted by general linkages or elastic linkages, preferably constituted by the elastic linkages which are capable of changing the length within a certain range when subjected to a large external force. When the wave energy generation apparatus is subjected to an instant impact, peak torque exerted to the linkage can be unloaded by the elastic linkage to avoid breakage of the linkage. Furthermore, at least one of a wind energy collecting unit and a solar energy collecting unit is mounted on the portion(s) of at least one pole 6 above the sea level, an ocean current collecting unit is mounted on the portion(s) of at least one pole 6 under the sea level, wherein the wind energy collecting unit, the solar energy collecting unit and the ocean current collecting unit belong to the prior art, thus the detailed description of them is omitted.

As shown in FIGS. 1-3, a guide rudder 4 arranged transversely is hinged or rotatively connected to the front end of the buoyancy compartment 3, inside of the buoyancy compartment 3 a guide rudder drive unit 41 is provided, which based on the received control command, drives the guide rudder 4 to deflect with respect to the main body of the buoyancy compartment and controls deflecting angle of the main body of the buoyancy compartment. The deflecting angle substantially refers to the deflecting angle of the guide rudder 4 with respect to the main body of the buoyancy compartment, particularly the front end of the buoyancy compartment. In the present embodiment, the guide rudder 4 is a cylindrical housing having a longitudinal cross-section in a form of approximate isosceles triangle. At the rear end of the guide rudder 4 (corresponding to the bottom side portion of the isosceles triangle), a first concave portion recessing forward is integrally formed, which is fitted with the front end of the buoyancy compartment 3. A tip portion according to the present invention is constituted by the front side portion of the guide rudder 4 (corresponding to a structure formed by two equal sides of the isosceles triangle). It is easy to be understood that the longitudinal cross-section of the guide rudder 4 can be a wedge-shape so as to form a wedge portion. In the present embodiment, a rotation shaft that constitutes deflection executing means is mounted at the front end of the buoyancy compartment 3. The guide rudder 4 is rotatively connected to the buoyancy compartment 3 via the rotation shaft to achieve a deflecting angle of the guide rudder 4 with respect to the buoyancy compartment 3, and thereby to control force which wave exerts to the buoyancy compartment 3. It is easy to be understood that, the buoyancy compartment 3 is subjected to an upward force which is capable of increasing an ascent rate of the buoyancy compartment 3 when the guide rudder 4 is driven to deflect upward by the guide rudder drive unit 41; the buoyancy compartment 3 is subjected to a downward force which is capable of suppressing the ascent rate of the buoyancy compartment 3 or increasing a sinking rate of buoyancy compartment 3 when the guide rudder 4 is driven to deflect downward by the guide rudder drive unit 41. Meanwhile, the up deflecting of guide rudder 4 during normal power generating can further guide wave to quickly pass the lower surface of the buoyancy compartment 3.

As shown in FIGS. 1-3, on the lower surface at the bottom of the rear end of the buoyancy compartment 3 a second concave surface portion 31 recessing upward (constitutes the recess portion) is formed, at which a perpendicular shaft impeller 7 is mounted. The perpendicular shaft impeller 7 is mounted at the rear end of the buoyancy compartment 3 in such a manner that its rotation shaft is perpendicular to the surging direction of wave, and meanwhile the axial direction of the perpendicular shaft impeller 7 is provided in parallel with the length direction of the buoyancy compartment 3. Furthermore, a kinetic energy conversion assembly transmission-connected to the perpendicular shaft impeller 7 for converting kinetic energy of the wave into hydraulic energy is equipped inside of the buoyancy compartment 3. In the present embodiment, the kinetic energy conversion assembly is constituted by a hydraulic pump which is transmission-connected to the perpendicular shaft impeller 7 through transmission means 11 such as gear train assembly and likes for converting kinetic energy of wave into hydraulic energy.

A ballast water tank 8 for receiving a predetermined amount of seawater is provided near the middle rear portion inside of the buoyancy compartment 3, volume of the ballast water tank and volume of the buoyancy compartment 3 are set into a specific ratio, which satisfies that, after the ballast water tank is filled with water, the total weight of the buoyancy compartment 3 is greater than or equal to the buoyancy of the whole buoyancy compartment 3, and after the ballast water tank is drained out of water, the total weight of the buoyancy compartment 3 is less than the buoyancy of the whole buoyancy compartment 3. A water filling and draining unit is provided at the bottom of the ballast water tank 8, wherein the water filling and draining unit is a prior-art combination, for example, comprising an electric controlled valve with one end connected to the ballast water tank 8 and another end connected to the lower surface of the buoyancy compartment 3, an air compression device, and a high pressure gas tank 12. During normal operation, no water is filled in the ballast water tank 8, the electric controlled valve is closed, the buoyancy compartment 3 floats on the water surface, the air compression device compresses air to the high pressure gas tank 12 for storing compressed air; during sinking of the buoyancy compartment 3, the electric controlled valve is opened, water fills the ballast water tank 8; when the buoyancy compartment 3 needs to float up, the high pressure air tank fills air into the buoyancy compartment 3, the electric valve is opened, so that the seawater can be drained out of the ballast water tank 8. The water filling and draining unit of the ballast water tank 8 is signal-connected to a control unit of the wave energy generation apparatus, which can control the operation state of the water filling and draining unit on the basis of the marine environment (for example, wave crest, wave trough, wave level difference, wave height, etc.) where the wave energy generation apparatus is in and thereby control the water filling amount inside of the ballast water tank 8 so as to adjust the up and down floating degree of the buoyancy compartment 3 with respect to the sea level.

Furthermore, an energy accumulator 9 and a heat sink 10 are equipped inside of the buoyancy compartment 3, wherein the energy accumulator 9 is used for accumulating energy during operation of a single set of wave energy collecting unit 1 and is used for stabilizing voltage pressure in the whole wave energy generating system, the heat sink 10 is used for dissipating heat of a plurality of members equipped inside of the buoyancy compartment 3, which ensures the operation state of these members.

Moreover, the wave energy generation apparatus further comprises a wave gauge for detecting wave parameters such as wave length, wave height and likes. The entire wave energy generation apparatus has a control unit constituted by an integrated circuit board, the control unit is signal-connected or electrically connected to the wave gauge, the above mentioned guide rudder drive unit 41, the ballast water tank 8, the potential energy conversion assembly (e.g., the hydraulic cylinder 5), the kinetic energy conversion assembly (e.g., a hydraulic pump), the energy accumulator 9, the heat sink 10 and others respectively to achieve information interaction, and thereby to control the operation states of above mentioned members. In the present invention, in the control unit, it is necessary to predetermine the corresponding relations among deflecting angle of the guide rudder 4 with respect to the buoyancy compartment 3, the water filling amount in the ballast water tank 8 and the different operation states of the wave energy generation apparatus whereby a range of the deflecting angle of the guide rudder 4 with respect to the buoyancy compartment 3 and the water filling amount in the ballast water tank 8 under different operation states are defined, that is a corresponding relations among these three is needed to be established, whereby the range of deflecting angle of the guide rudder 4 and the water filling amount in the ballast water tank 8 are customized as, for example, a normal power generation mode, an emergency protection mode, a shutdown protection mode, and the like. The control unit can send a control commands to the guide rudder drive unit 41 and the ballast water tank 8 on the basis of the wave parameters from the wave gauge, and thereby to control the deflecting angle of the guide rudder 4 with respect to the buoyancy compartment 3 and the water filling amount in the ballast water tank 8. It is easy to be understood that the wave gauge can make direct information interaction with the guide rudder drive unit 41 and the ballast water tank 8; based on the control commands sent by the wave gauge, the deflecting of the guide rudder 4 with respect to the buoyancy compartment 3 can be driven by the guide rudder control unit 41 and the deflecting angle thereof can be controlled by the same; the water filling amount inside of the ballast water tank 8 can be controlled by the water filling and draining unit of the ballast water tank 8 on the basis of the control commands sent by the wave gauge, so that the weight of buoyancy compartment 3 per se can be controlled, whereby the up and down floating degree of the buoyancy compartment 3 with respect to the sea level can be adjusted.

Hereafter, operation mechanism of the wave energy generation apparatus will be described in a simple way with reference made to FIGS. 1 to 7.

1) The Wave Energy Generation Apparatus is in a Normal Power Generating State

Figure 4:
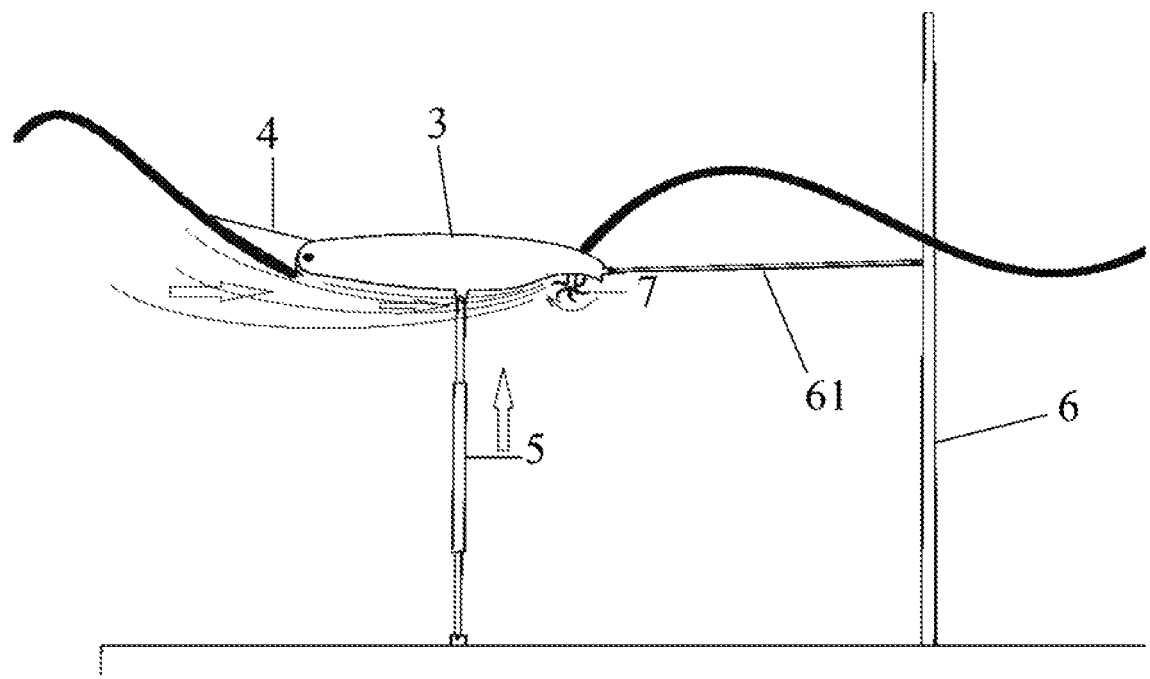
FIG. 4 is a schematic diagram of the wave energy generation apparatus shown in FIG. 1 which is in a normal power generating state.

As shown in FIG. 4, when waves on the sea surface are in normal condition, detected wave information is sent to the control unit of the wave energy generation apparatus by the wave gauge, control commands are sent to the guide rudder drive unit 41 by the control unit, and the guide rudder drive unit 41 based on the control commands drives the guide rudder 4 to deflect with respect to the buoyancy compartment 3 and controls the deflecting angle thereof to be within a normal power generation mode; in this state, the guide rudder 4 is driven to deflect upward and fixed, the ballast water tank 3 is drained out (i.e. no water is filled), the weight of the buoyancy compartment 3 is minimized and the buoyancy compartment is in an optimum power generating state, an ascent rate of the buoyancy compartment 3 is increased by kinetic energy of surging wave, during this process the buoyancy compartment 3 is raised to wave crest by wave and then falls to wave trough due to the gravity, reciprocating motion of piston rod with respect to the above mentioned hydraulic cylinder 5 is driven by the up and down floating motion of the buoyancy compartment 3 in the longitudinal direction, potential energy of wave is converted into hydraulic energy by the hydraulic cylinder 5; meanwhile, wave that is guided and forced to flow along the lower surface of the buoyancy compartment 3 by the guide rudder 4, the perpendicular shaft impeller 7 located at the rear end of the buoyancy compartment 3 is pushed to rotate by wave, the hydraulic pump that is transmission-connected with the perpendicular shaft impeller 7 is driven into operation by it, kinetic energy of wave is converted into hydraulic energy by the hydraulic pump, in this way, collections of kinetic energy and potential energy of wave are achieved, the wave energy is converted into hydraulic energy which is gathered together, voltage-stabilized, and then transmitted to the power generation platform 2 to be converted into electric energy.

Figure 5:
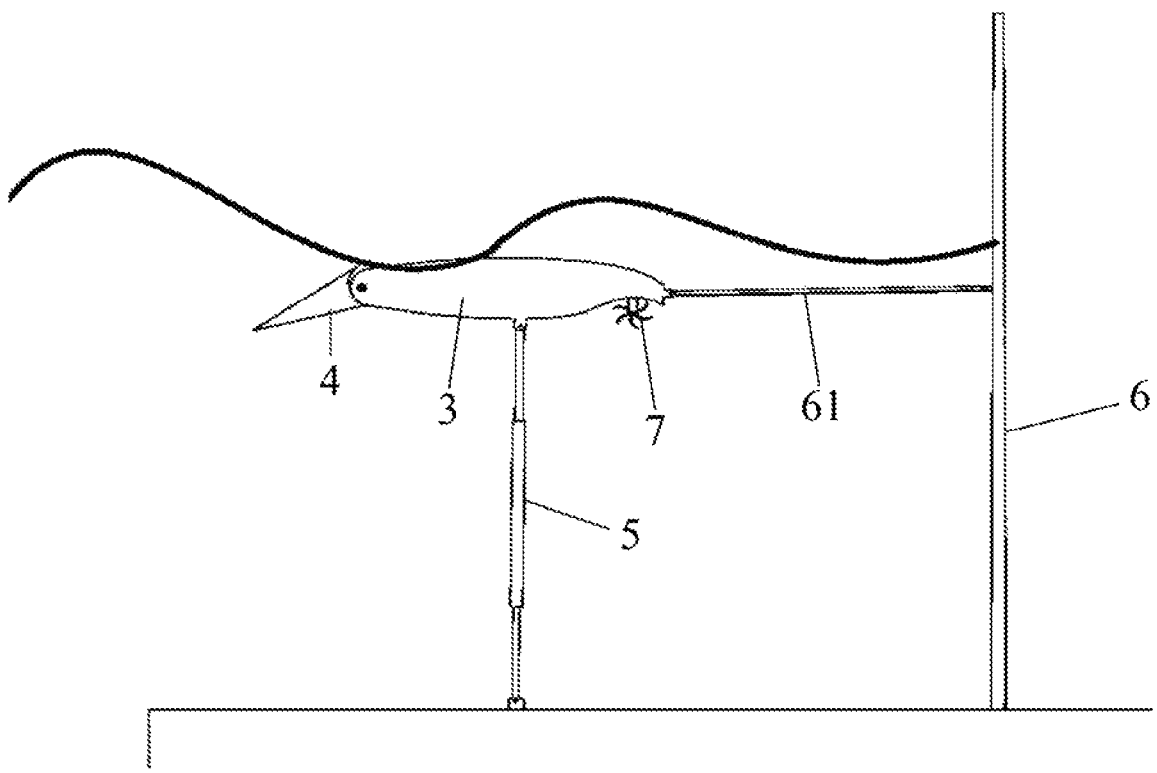
FIG. 5 is a schematic diagram of the wave energy generation apparatus shown in FIG. 1 which is in an emergency protection state.

2) The Wave Energy Generation Apparatus is in a Power-Limiting Operation Protection State As shown in FIG. 5, when waves on the sea level are relative large, detected wave information is sent to the control unit of the wave energy generation apparatus by the wave gauge, control commands are sent to the guide rudder drive unit 41 by the control unit, and the deflecting angle of the guide rudder 4 with respect to the buoyancy compartment 3 is controlled to be in an emergency protection mode by the guide rudder drive unit 41 on the basis of the control commands; in this state, the guide rudder 4 is turned downward by a certain angle with respect to the main body of the buoyancy compartment and fixed in this position, kinetic energy of wave is used for pressing down the buoyancy compartment 3, the ballast water tank 8 is partially filled with seawater to increase weight of the buoyancy compartment 3, thereby to suppress the ascent rate and height of the buoyancy compartment 3 for serving the purpose of protecting the buoyancy compartment 3. In this emergency protection state, the guide rudder 4 does not move up and down accompanying with wave, and the buoyancy compartment 3 and the perpendicular shaft impeller 7 can continue to operate (as described above in the normal power generation state) for collecting wave energy, the wave energy is converted into hydraulic energy which is gathered together, voltage-stabilized, and transmitted to the power generation platform 2 to be finally converted into electric energy.

3) The Wave Energy Generation Apparatus is in a Shutdown Protection State

Figure 6:
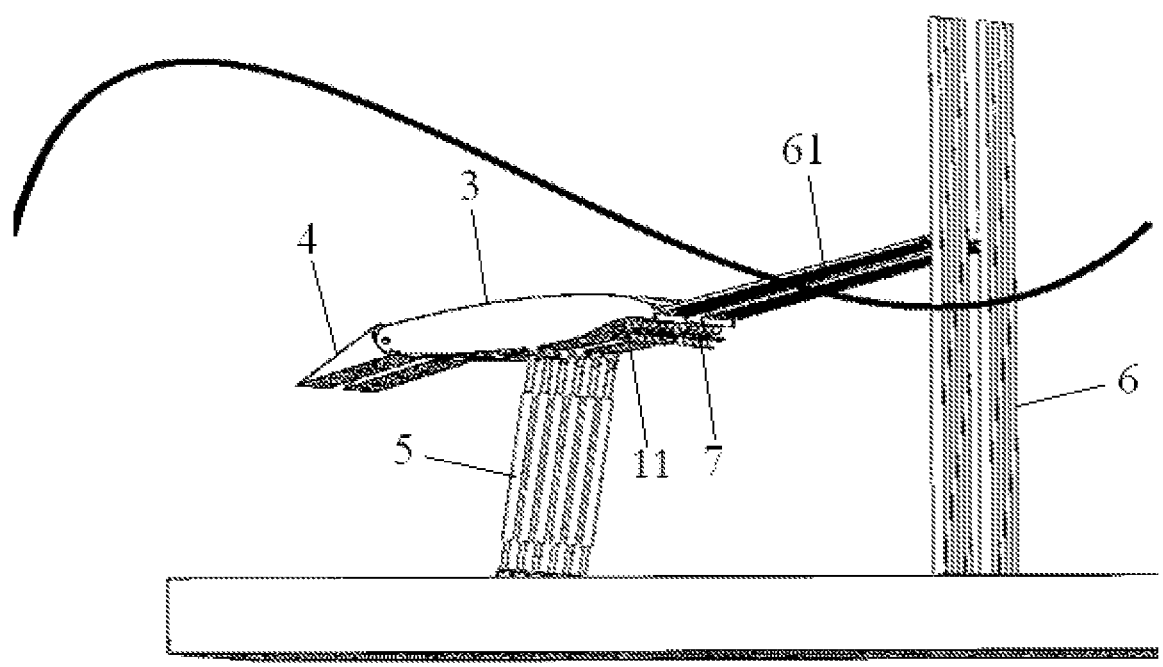
FIG. 6 is a schematic diagram of the wave energy generation apparatus shown in FIG. 1 which is in a shutdown protection state.

As shown in FIG. 6, when waves on the sea level are extremely large, detected wave information is sent to the control unit of the wave energy generation apparatus by the wave gauge, control commands are sent to the guide rudder drive unit 41 by the control unit, and the deflecting angle of the guide rudder 4 with respect to the buoyancy compartment 3 is controlled to be within the shutdown protection mode by the guide rudder control unit 41 on the basis of the control commands; in this state, the guide rudder 4 is turned downwardly to the lowest angle with respect to the main body of the buoyancy compartment and fixed in this position, the ballast water tank 3 is filled up with water so that total weight of the buoyancy compartment 3 is greater than the maximum buoyancy of the buoyancy compartment 3, and thereby to sink the buoyancy compartment 3 under the sea surface, at this point the wave energy collecting device is in the shutdown state and stops collecting wave energy, and thereby allows protection of the floating tank 3.

4) The Wave Energy Generation Apparatus is in an Inspection State

Figure 7:
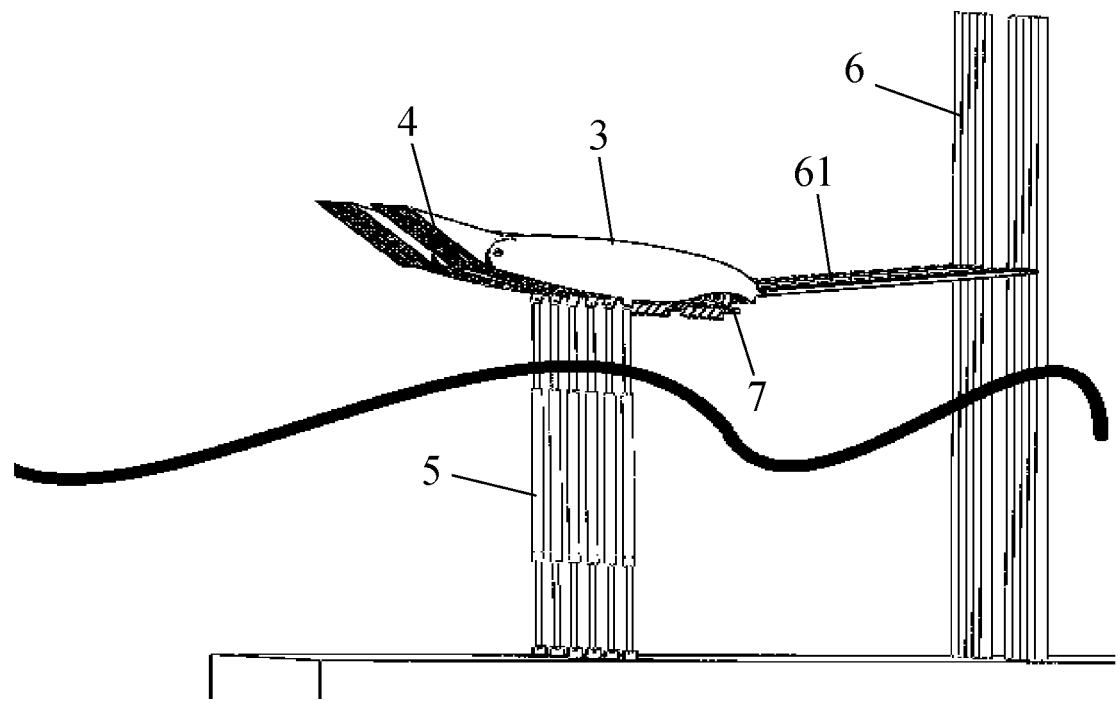
FIG. 7 is a schematic diagram of the wave energy generation apparatus shown in FIG. 1 which is in an inspection state.

As shown in FIG. 7, when maintenance and inspection of the wave energy generation apparatus is needed, the hydraulic cylinders 5 is controlled by the hydraulic system 51 to be elongated, the buoyancy compartment 3 is raised away from water surface by the elongated hydraulic cylinders 5. Since the buoyancy compartment 3 is away from water surface at this point and does not swing with surging of wave, it is easy to maintain and inspect the wave energy generation device.

The wave energy generation apparatus according to the present invention has following technical effects:

Firstly, the energy collecting assembly (e.g. buoyancy compartment 3) of the wave energy generation apparatus mainly uses the horizontal positioning assembly to achieve position in the horizontal direction and uses the vertical position-restricting assembly to achieve position restricting in the vertical direction, in this way, multiple sets of wave energy collecting units of the wave energy generation apparatus can be set individually on the sea floor and fixed on a fixed point, and drift and collision of the wave energy collecting units can be avoid, the sets of wave energy collecting units work independently without interference to each other, the collected energy is gathered to the power generation platform, which is advantageous for intensively constructing large wave energy stations in large scale. Meanwhile, a wind energy collecting unit and a solar energy collecting unit are mounted on the portion(s) of at least one pole of the horizontal positioning assembly above the sea level, an ocean current collecting unit is mounted on the portion(s) thereof under the sea level, in this way, a multi-purposes pole can be achieved, which is suitable for constructing sea integrated power stations in large scale.

Furthermore, two poles 6 are connected by the balancing linkage 62, two linkages 61 are provided between a single pole 6 and the buoyancy compartment 3, their front ends are arranged and spaced apart on the buoyancy compartment 3, and their rear ends are gathered together on the, in this way, a connection structure with a triangular arrangement is formed between the buoyancy compartment 3 and the single pole 6 and another connection structure with a triangular arrangement is formed among the adjacent poles and the buoyancy compartment 3, these connection structures have great stability and are advantageous for improving the stability of position horizontally preformed by the horizontal positioning assembly to the buoyancy compartment 3. A first auxiliary fixing rod 63 and a second auxiliary fixing rod 64 can be used for reinforcing position of poles 6, which is advantageous for improving the stability of poles 6.

Secondly, the guide rudder 4 which is provided on the front end of the buoyancy compartment 3 and adjustable in terms of angles can, on one hand, increase the ascent rate of the buoyancy compartment 3 and thus improve the collection efficiency of potential energy of wave, so as to improve generation efficiency; on the other hand, it can guide and force wave to flow along the lower surface of the buoyancy compartment 3, and thus is advantageous for driving rotation of the perpendicular shaft impeller at the rear end of the buoyancy compartment 3 and for improving collection efficiency and effect of wave energy, so as to improve generation efficiency. Furthermore, the guide rudder 4 can change its deflecting angle with respect to the buoyancy compartment 3 on the basis of magnitude of wave by driving of the guide rudder drive unit 41, adjust the weight of the buoyancy compartment 3 in connection with the ballast water tank 8, and the sinking rate and extent of the buoyancy compartment 3 with respect to the sea level thus can be adjusted, and thereby the buoyancy compartment 3 can be protected effectively, for example, when wave is small on the sea level, the guide rudder 4 is driven to deflect upward and the ballast water tank 8 is drained out to minimize the weight of the buoyancy compartment 3, thus the ascent rate of the buoyancy compartment body can be increased to the maximum extent by utilizing kinetic energy of wave. In the case of large wave caused by extremely strong wind, the guide rudder 4 is driven to deflect downward while the ballast water tank 8 is filled up with water, at this point the weight of the buoyancy compartment 3 is maximum which is greater than its buoyancy, cooperating with kinetic energy of wave the buoyancy compartment 3 is pressed down and quickly sinks below the sea level, so as to protect the buoyancy compartment 3.

Thirdly, the perpendicular shaft impeller 7 is provided on the lower surface at the bottom of the rear end of the buoyancy compartment 3 and is mounted at the rear end of the buoyancy compartment 3 in such a manner that its rotation shaft is perpendicular to the surging direction of wave, in this way, the kinetic energy of wave can be collected more efficiently and it is advantageous for improving collection efficiency and effect of kinetic energy of wave. Furthermore, since the guide rudder 4 and the perpendicular shaft impeller 7 are arranged on the two ends of the longitudinal axis of the buoyancy compartment 3 respectively, combining with the concave surface design for guiding flow at the rear end of the buoyancy compartment 3, in this way, the flowing speed of wave along the lower surface of the buoyancy compartment 3 can be increased, which is conductive for the perpendicular shaft impeller 7 to better collect kinetic energy of wave and is advantageous for improving the collection efficiency and effect of wave energy.

Fourthly, since the ballast water tank 8 is provided, the weight of the buoyancy compartment 3 can be adjusted by adjusting water filling amount inside of the ballast water tank 8 on the basis of the real-time sea condition, and the floating extent of buoyancy compartment 3 with respect to the sea level thus can be adjusted to allow power-limiting operation of the wave energy generation apparatus in the case of overload due to large wave, and to allow the buoyancy compartment 3 to be controlled to sink under sea level to avoid extremely large wave and to achieve shutdown protection function in the case of extreme sea condition, it is conducive to improve stability and viability of the wave energy generation apparatus in various working condition. After the sea condition is back to calm, water inside of the ballast water tank 8 is drained out by the water filling and draining unit, and the floating tank 3 floats back to above the water surface again and remains in normal operation.

Fifthly, the longitudinal cross-section of the buoyancy compartment 3 is in a form of transversely set elongated ellipse or spindle, since the surface of the elongated ellipse or spindle is a smooth arc, it can reduce resistance imposed by seawater flowing across the surface of the buoyancy compartment 3, and thus increase the passing speed of wave and is conducive to improve the collection effect of potential energy.

Sixthly, the wave energy generation apparatus is provided with both the potential energy collecting assembly and the kinetic energy collecting assembly, so that collection of potential energy and collection of kinetic energy can be performed at the same time, comparing to single collection of potential energy or kinetic energy in the prior art, it is conducive to improve the collection efficiency of wave energy.

Seventhly, when the energy collection units are being inspected and repaired, the hydraulic cylinder 5 is controlled to be elongated by the raising oil pump 51, so that the buoyancy compartment 3 is raised above the water surface to facilitate the maintenance of the buoyancy compartment 3.

Eighthly, the design of elastic linkages is employed by each linkage (for example, the linkage 61, and the balancing linkage 62) to avoid breakage when the wave energy generation apparatus is subjected to an instant large wave impact.

The foregoing is only preferred embodiments of the present invention, which are not intended to limit the present invention. Any modification, substitution and improvement made within the spirit and principles of the present invention, should be included within the protection scope of the present invention.

For example, in the above mentioned embodiments, the guide rudder 4 and the ballast water tank 8 are controlled by control commands sent by the control unit on the basis of information from the wave gauge, but this is not an essential limitation. The control method to the guide rudder 4 and the ballast water tank 8 can also be a manually active control and a passive hydraulic system overload protection control.

For example, in the above mentioned embodiments, the deflection actuator means is a rotation shaft, the guide rudder 4 is rotatively connected to the buoyancy compartment 3 via this rotation shaft, but this is not an essential limitation. The deflection executing means can be an arc-shaped slide rail provided at the front end of the buoyancy compartment 3. Correspondingly, a connection fulcrum (e.g., a projection) cooperated with the arc-shaped slide rail is provided on the guide rudder 4, through engagement of connection fulcrum with the arc-shaped slide rail, the guide rudder 4 forms a sliding connection with the buoyancy compartment 3 so that the guide rudder 4 operates along the arc-shaped slide rail, so as to adjust the deflecting angle of the guide rudder 4 with respect to the main body of the buoyancy compartment.

For example, in the above mentioned embodiments, the ballast water tank 8 is provided inside of the buoyancy compartment 3, but this is not an essential limitation. The ballast water tank 8 can also be provided outside of the buoyancy compartment 3 as long as the ballast water tank 8 can be ensured to be connected to the buoyancy compartment 3.

For example, in the above mentioned embodiments, the ballast water tank 8 is provided near a middle rear portion of the buoyancy compartment 3, but this is not an essential limitation. The ballast water tank 8 can also be provided at a position near the center of gravity of the buoyancy compartment 3.

For example, in the above mentioned embodiments, the perpendicular shaft impeller 7 is directly or indirectly connected with the kinetic conversion assembly (e.g., a hydraulic pump), if the perpendicular shaft impeller 7 is a low power unit, its rotation shaft is directly connected to a shaft of the hydraulic pump, otherwise a set of transmission assembly is needed. The transmission assembly can be transmission gear box assembly, chain or other transmission assembly, the existing like transmission means 11 are all included in the protection scope of the present invention.

Figure 8:
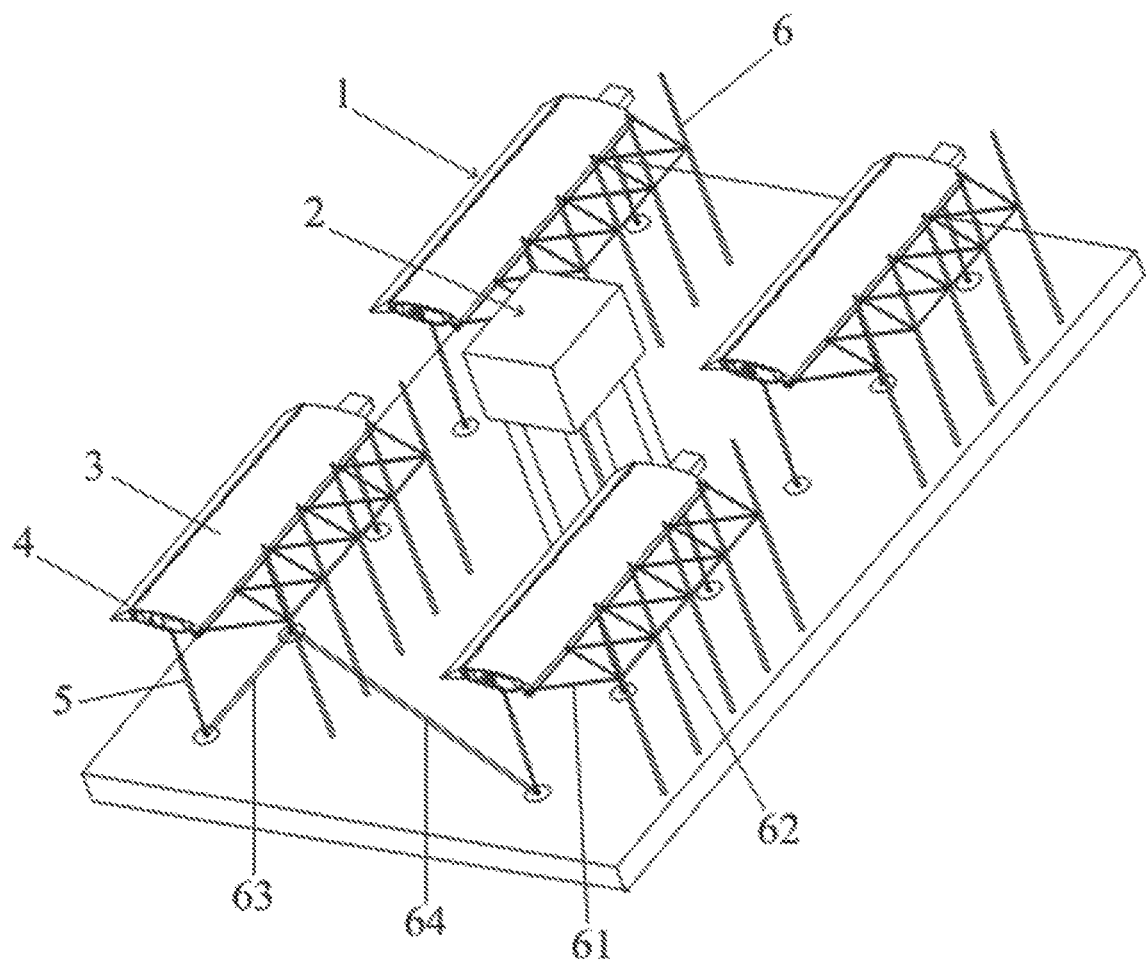
FIG. 8 is an oblique top view of a wave energy generation apparatus, which is the second embodiment.

For example, the overall structure of the wave energy generation apparatus is not limited to those shown in FIGS. 1 to 7, as a second embodiment, another overall structure of the wave energy generation apparatus is proposed in FIG. 8. As shown in FIG. 8, a first auxiliary fixing rod 63 for connecting the hydraulic cylinder 5 and the pole 6 in the same set of wave energy collecting unit 1 is provided therebetween, one end of the first auxiliary fixing rod 63 is fixed connected or hinged to the pole 6 (e.g., at the connection point of the linkage 61 and the balancing linkage 62 to the pole 6), another end is fixedly connected or hinged to the fixed point of the hydraulic cylinder 5 on the sea floor (i.e. the bottom of the hydraulic cylinder 5); a second auxiliary fixing rod 64 for connecting the hydraulic cylinder 5 of one set of the wave energy collecting unit and a pole 6 of the adjacent wave energy collecting unit 1 is provided therebetween, one end of the second auxiliary fixing rod 64 is fixedly connected or hinged to the fixing point of the hydraulic cylinder 5 of the one set of the wave energy collecting unit on the sea floor (i.e. the bottom of the hydraulic cylinder 5), another end is fixedly connected or hinged to the pole 6 (e.g., at the connection point of the linkage 61 and the balancing linkage 62 to the pole 6) of the adjacent wave collecting unit. Wherein, both the first auxiliary fixing rod 63 and the second auxiliary fixing rod 64 can be constituted by general linkages or elastic linkages, preferably constituted by the elastic linkages. Particularly, arrangement of the first auxiliary fixing rod 63 and the second auxiliary fixing rod 64 is for increasing the stability of poles 6, but this is not an essential limitation. Other reinforcement methods for the poles 6 are included in the protection scope of the present invention.

For example, the drawings merely illustrate structural relation and do not intend to limit proportional relation. Although the specific configuration of the poles 6 has not been defined in the above description, the poles 6 should pass the standard that a single pole 6 or the poles 6 cooperated with the first auxiliary fixing rod 63 and the second auxiliary fixing rod 64 is/are sufficient to support horizontally stabilized structure of the whole system; although no specific limit have been made to the strength of the linkage 61 and the balancing linkage 62, the strength of the linkage 61 and the balancing linkage 62 should pass the standard that the structural stability of the various parts and assemblies can be met. Moreover, the dimensions of the various parts and assemblies are not limited to the proportional relation of the drawings.

For example, function of the air compression device in the water filling and draining unit is to provide compressed air for the high pressure gas tank 12. According to the actual sea conditions, if the frequency of use of the high pressure gas tank 12 is low, the high pressure gas tank 12 can be manually gas-filled during inspection, and thus the air compression device is not a necessary device.

The invention claimed is:

1. A wave energy generation apparatus comprising multiple sets of wave energy collecting units, wherein a single set of the wave energy collecting unit comprises:
   an energy collecting assembly for collecting wave energy, comprising a potential energy collecting assembly for collecting potential energy of wave and a kinetic energy collecting assembly for collecting kinetic energy of wave, wherein the potential energy collecting assembly comprises a buoyancy compartment, and a hydraulic cylinder hinged to the buoyancy compartment; and
   a positioning assembly for positioning of the buoyancy compartment, comprising a vertical position-restricting assembly constituted by the hydraulic cylinder for restricting a position of the buoyancy compartment;
   wherein:
      the positioning assembly further comprises a horizontal positioning assembly which horizontally positions the buoyancy compartment,
      the horizontal positioning assembly comprises at least one pole fixed vertically on the sea floor,
      the buoyancy compartment is connected to the at least one pole by a connecting element, the buoyancy compartment is a housing having a longitudinal cross-section in a form of transversely set elongated ellipse or spindle, a guide rudder is hinged or rotatively connected to a front end of the buoyancy compartment outside of the buoyancy compartment, and inside of the buoyancy compartment a guide rudder drive unit is provided for driving the guide rudder to deflect with respect to the main body of the buoyancy compartment based on received control commands.

2. The wave energy generation apparatus according to claim 1, wherein the end of the guide rudder away from the buoyancy compartment is formed with a tip portion or wedge-shaped portion.

3. The wave energy generation apparatus according to claim 1, wherein a ballast water tank for adjusting up and down floating degree of the buoyancy compartment with respect to the sea level by changing water filling amount is further included, which is connected to the buoyancy compartment.

4. The wave energy generation apparatus according to claim 3, wherein the ballast water tank is provided inside of the buoyancy compartment.

5. The wave energy generation apparatus according to claim 3, wherein volume of the ballast water tank and volume of the buoyancy compartment are set into a specific ratio, which satisfies that, after the ballast water tank is filled with water, the total weight of the buoyancy compartment is greater than or equal to the buoyancy of the whole buoyancy compartment, and after the ballast water tank is drained out of water, the total weight of the buoyancy compartment is less than the buoyancy of the whole buoyancy compartment.

6. The wave energy generation apparatus according to claim 3, wherein the ballast water tank is provided at a position near a center of gravity or a middle rear portion of the buoyancy compartment.

7. The wave energy generation apparatus according to claim 1, wherein the kinetic energy collecting assembly comprises a perpendicular shaft impeller, which is mounted at the rear end of the buoyancy compartment, wherein a rotation shaft of the perpendicular shaft impeller is perpendicular to a surging direction of wave.

8. The wave energy generation apparatus according to claim 7, wherein a recess portion recessing upward is provided on the lower surface of the buoyancy compartment, and the perpendicular shaft impeller is mounted at the recess portion.

9. The wave energy generation apparatus according to claim 7, wherein a kinetic energy conversion assembly transmission-connected to the perpendicular shaft impeller for converting kinetic energy of wave into hydraulic energy is received inside of the buoyancy compartment.

10. The wave energy generation apparatus according to claim 1, wherein the potential energy collecting assembly further comprises at least one vertically provided hydraulic cylinder for collecting potential energy of wave, two ends of the hydraulic cylinder are hinged to the sea floor and the buoyancy compartment respectively.

11. The wave energy generation apparatus according to claim 10, wherein a hydraulic system that is cooperated with the hydraulic cylinder and that is configured for controlling elongation of the hydraulic cylinder to raise the buoyancy compartment away from the water surface is provided inside of the buoyancy compartment.

12. The wave energy generation apparatus according to claim 1, wherein at least one linkage is provided between the single pole and the buoyancy compartment, and two ends of the linkage are rotatively connected or hinged to the pole and the buoyancy compartment respectively, the connecting element is constituted by the at least one linkage.

13. The wave energy generation apparatus according to claim 12, wherein two said linkages are provided, the front ends of these two linkages are provided and spaced apart on the buoyancy compartment and their rear ends are gathered together on the pole.

14. The wave energy generation apparatus according to claim 1, wherein a balancing linkage for connecting two adjacent poles is provided therebetween.

15. The wave energy generation apparatus according to claim 14, wherein the connecting element and/or the balancing linkage is constituted by an elastic linkage.

16. The wave energy generation apparatus according to claim 1, wherein a first auxiliary fixing rod for connecting the vertical position-restricting assembly and the at least one pole of a same set of the wave energy collecting unit is provided therebetween.

17. The wave energy generation apparatus according to claim 1, wherein a second auxiliary fixing rod for connecting the vertical positioning position-restricting assembly of one set of the wave energy collecting unit and the at least one pole of an adjacent set of the wave energy collecting unit is provided therebetween.

18. The wave energy generation apparatus according to claim 1, wherein at least one of an energy accumulator, a heat sink and a high pressure gas tank is provided inside of the buoyancy compartment.

* * * * *